(12) United States Patent
Hikosaka

(10) Patent No.: US 10,620,391 B2
(45) Date of Patent: Apr. 14, 2020

(54) OPTICAL CONNECTOR

(71) Applicant: YAZAKI CORPORATION, Tokyo (JP)

(72) Inventor: Tomohiro Hikosaka, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/357,217

(22) Filed: Mar. 18, 2019

(65) Prior Publication Data

US 2019/0310434 A1 Oct. 10, 2019

(30) Foreign Application Priority Data

Apr. 5, 2018 (JP) .................................. 2018-073414

(51) Int. Cl.
*G02B 6/36* (2006.01)
*G02B 6/42* (2006.01)

(52) U.S. Cl.
CPC ......... *G02B 6/4262* (2013.01); *G02B 6/4206* (2013.01); *G02B 6/4245* (2013.01); *G02B 6/4246* (2013.01); *G02B 6/4292* (2013.01); *G02B 6/4204* (2013.01); *G02B 6/426* (2013.01); *G02B 6/4228* (2013.01)

(58) Field of Classification Search
None
See application file for complete search history.

(56) References Cited

U.S. PATENT DOCUMENTS

| 7,324,729 B2* | 1/2008 | Fukuyama | ........... G02B 6/4246 385/15 |
|---|---|---|---|
| 9,939,594 B2* | 4/2018 | Morioka | ............. G02B 6/4214 |
| 2010/0232751 A1 | 9/2010 | Biwa et al. | |
| 2015/0355423 A1 | 12/2015 | Hikosaka | |

FOREIGN PATENT DOCUMENTS

| EP | 0 646 816 B1 | 1/2002 |
|---|---|---|
| JP | 2014-222256 A | 11/2014 |

* cited by examiner

*Primary Examiner* — Jennifer Doan
(74) *Attorney, Agent, or Firm* — Kenealy Vaidya LLP

(57) ABSTRACT

An optical connector includes a lens body including a lens portion, an optical conversion module, and a housing including an accommodation portion having a recessed portion, the optical conversion module combined with the lens body being fitted and assembled into the accommodation portion. The optical conversion module includes a light element disposed at a position facing the lens portion when combining the optical conversion module with the lens body. The housing includes a longitudinal support mechanism. The longitudinal support mechanism includes a reference surface and a pressing rib.

5 Claims, 16 Drawing Sheets

OPTICAL CONNECTOR

CROSS REFERENCE TO RELATED APPLICATIONS

This application claims priority from Japanese Patent Application No. 2018-073414 filed on Apr. 5, 2018, the entire contents of which are incorporated herein by reference.

BACKGROUND OF THE INVENTION

Field of the Invention

The present invention relates to an optical connector.

Description of Related Art

There has been known an optical connector used in the field of optical communication that includes a housing, a shield case, a transmission/reception integrated lens, a light emitting side fiber optic transceiver (FOT), and a light receiving side FOT (for example, see Patent Document 1: JP-A-2014-222256).

[Patent Document 1] JP-A-2014-222256

According to a related art, in an optical connector having the structure described above, when the optical conversion module (FOT) is loosened relative to the housing, positional displacement occurs between the lens and the optical conversion module due to the looseness, and optical loss occurs between the lens and the optical conversion module. Further, if the support of the optical conversion module with respect to the housing is weak, the optical conversion module may be displaced or inclined with respect to the housing due to a force applied at the time of adjusting and aligning positions of a plurality of lead frames extending from the optical conversion module.

SUMMARY

One or more embodiments provide an optical connector excellent in optical transmission and capable of positioning and supporting an optical conversion module with high accuracy without looseness with respect to a housing.

In an aspect (1), one or more embodiments provide an optical connector including a lens body having a lens portion, an optical conversion module, and a housing including an accommodation portion having a recessed portion, the optical conversion module combined with the lens body being fitted and assembled into the accommodation portion. The optical conversion module includes a light element disposed at a position facing the lens portion when combining the optical conversion module with the lens body. The housing includes a longitudinal support mechanism. The longitudinal support mechanism includes a reference surface and a pressing rib. The reference surface is provided at a bottom wall portion of the accommodation portion and abuts on a lower portion of the optical conversion module. The pressing rib is provided at an upper wall portion of the accommodation portion and abuts on an upper portion of the optical conversion module so as to press the optical conversion module against the reference surface.

In an aspect (2), the reference surfaces and the pressing ribs are provided at a plurality of positions spaced apart along a width direction of the accommodation portion. The width direction is a direction perpendicular to an opposing direction of the bottom wall portion and the upper wall portion.

In an aspect (3), the pressing rib is formed at a lower end of a protruding portion protruding downward from the upper wall portion.

In an aspect (4), the optical connector further comprising a lateral support mechanism. The lateral support mechanism includes a support protrusion, a support recessed portion, support ribs. The support protrusion protrudes toward an assembled side of the accommodation portion assembled with the optical conversion module. The support recessed portion is formed in the optical conversion module and fitted with the support protrusion. The support ribs are formed on both side portions of the support protrusions and press an inner side surfaces of the support recessed portions.

In an aspect (5), the support protrusions are provided at a plurality of positions spaced apart along a height direction of the accommodation portion. The support recessed portions are provided at a plurality of position spaced apart along the height direction of the optical conversion module. One of the support protrusions provided on the lower portion is integrally formed with the bottom wall portion. The height direction is the opposing direction of the bottom wall portion and the upper wall portion.

According to the aspect (1), when the optical conversion module combined with the lens body is fitted into the accommodation portion of the housing, the optical conversion module is pressed against the reference surface by the pressing ribs of the longitudinal support mechanism. Accordingly, the optical conversion module can be assembled to the housing in a state of being positioned with high accuracy in a longitudinal direction without looseness. Therefore, positional displacement between the lens body and the optical conversion module due to the looseness of the optical conversion module with respect to the housing can be eliminated, optical loss between the lens portion of the lens body and the light element of the optical conversion module is suppressed, so that a high performance optical connector excellent in optical transmission can be provided. Further, the lower portion of the optical conversion module is in contact with the reference surface of the accommodation portion of the housing so as to be positioned with high accuracy without inclination, so that the lead frames extending from the optical conversion module can be aligned in the width direction. Accordingly, when the optical connector is mounted on the circuit board, the lead frames can be accurately disposed and fitted to the pad of the circuit board, and the lead frames can be smoothly inserted and fitted to the through holes of the circuit board. Further, the optical conversion module is strongly supported in the accommodation portion of the housing by the longitudinal support mechanism, so that the optical conversion module can be suppressed from being displaced or inclined with respect to the housing due to a force applied at the time of adjusting and aligning positions of the lead frames extending from the optical conversion module. Accordingly, the lead frames can be satisfactorily connected to the pad and through holes of the circuit board.

According to the aspect (2), the reference surfaces and the pressing ribs are provided at a plurality of positions spaced apart in the width direction of the accommodation portion, so that the optical conversion module can be positioned in a well-balanced manner in the width direction with respect to the housing, and the positioning accuracy of the optical conversion module can be further improved.

According to the aspect (3), the pressing rib is formed at the lower end of the protruding portion, so that the supporting strength of the pressing rib can be increased, and the optical conversion module can be more reliably pressed against the reference surface. Further, a gap is formed, due to the protruding portion, between the optical conversion module fitted into the accommodation portion and the upper wall portion of the accommodation portion. Accordingly, the heat generated by the light element of the optical conversion module can be smoothly discharged from the gap to the outside, and the influence of heat can be suppressed by improving the heat radiation effect of the light element.

According to the aspect (4), when the optical conversion module combined with the lens body is fitted into the accommodation portion of the housing, the support protrusion is fitted into the support recessed portion, and the inner side surface of the support recessed portion is pressed by the support ribs formed on the support protrusion. Accordingly, the optical conversion module can be assembled in a state of being positioned with high accuracy without looseness in the lateral direction with respect to the housing, optical loss between the lens portion of the lens body and the light element of the optical conversion module can be suppressed, and a high performance optical connector excellent in optical transmission can be provided. In addition, since the optical conversion module is positioned with high accuracy in the lateral direction with respect to the housing, the lead frames extending from the optical conversion module are also positioned with high accuracy. Accordingly, when the optical connector is mounted on the circuit board, the lead frames can be accurately disposed and fitted to the pad of the circuit board, and the lead frames can be smoothly inserted and fitted to the through holes of the circuit board.

According to the aspect (5), the optical conversion module is positioned in the height direction at a plurality of positions spaced apart by the support protrusions and the support recessed portions, so that the optical conversion module can be positioned in a well-balanced manner in the height direction with respect to the housing, and the positioning accuracy of the optical conversion module can be further improved. Further, it is possible to suppress the relative rotational displacement between the housing and the optical conversion module.

In addition, the support protrusion provided at the lower portion is integrally formed with the bottom wall portion of the accommodation portion, so that the support protrusion is reinforced, and distortion such as warp of the bottom wall portion having the reference surface can be suppressed. Accordingly, the optical conversion module to be assembled to the housing can be positioned with higher accuracy.

According to one or more embodiments, it is possible to provide an optical connector excellent in optical transmission and capable of positioning and supporting an optical conversion module with high accuracy without looseness with respect to a housing.

The present invention has been briefly described as above. Further, details of the present invention will be clarified by reading a mode for implementing the present invention to be described below with reference to the accompanying drawings.

BRIEF DESCRIPTION OF THE DRAWINGS

FIG. 4A is a perspective view of the optical connector as seen from a rear side. FIG. 4B is a perspective view of a housing and a shield case as seen from the rear side.

FIG. 5A is a perspective view of an optical conversion module and the housing to which a lens body is attached as seen from the rear side. FIG. 5B is a perspective view of the housing, the lens body and the optical conversion module as seen from the rear side.

FIG. 7A is a perspective view as seen from the rear side. FIG. 7B is a perspective view as seen from a front side.

FIG. 13A is a sectional view of the optical conversion module and a part of the housing before the assembling. FIG. 13B is a sectional view of the optical conversion module and the part of the housing after the assembling.

DETAILED DESCRIPTION

Hereinafter, an embodiment according to the present invention will be described with reference to the drawings.

Figure 1:
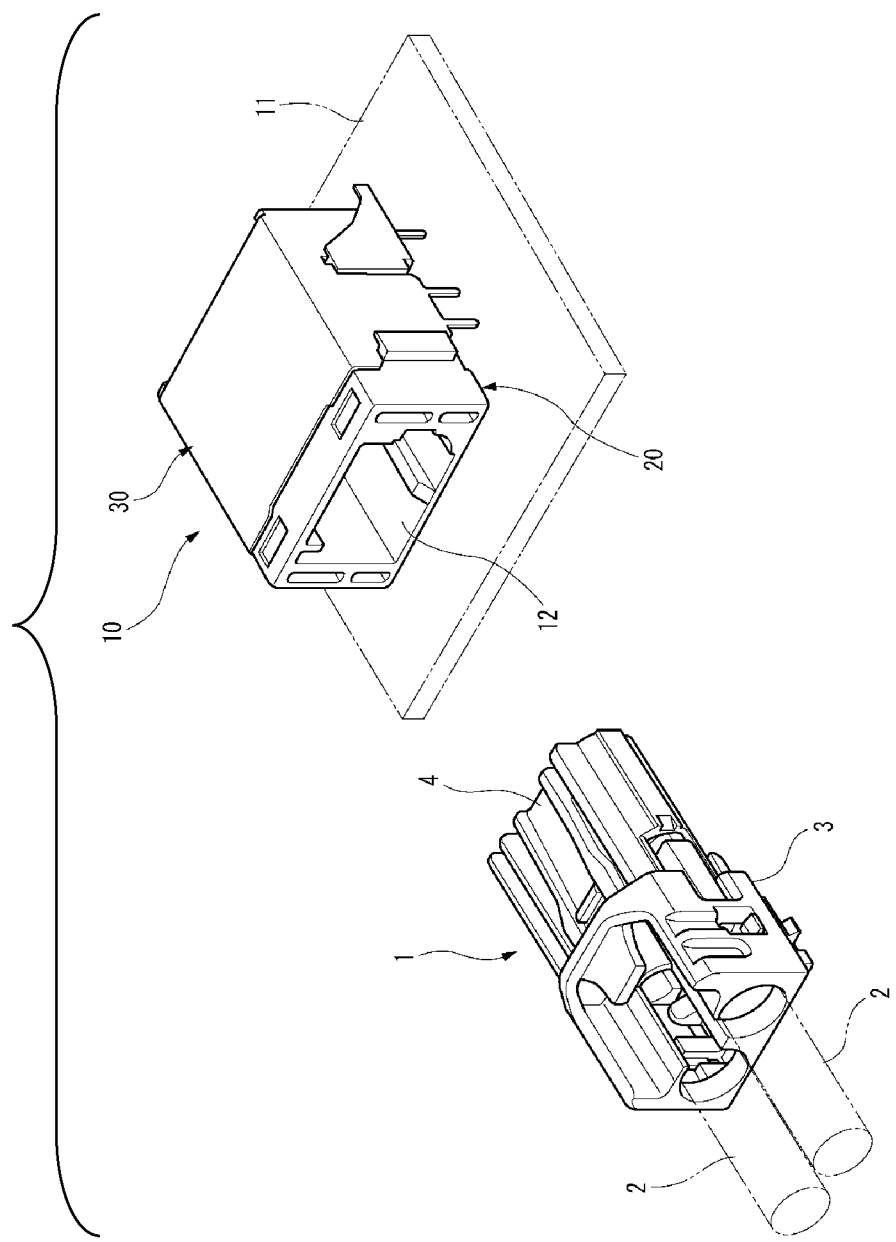
FIG. 1 is a perspective view of an optical connector according to the present embodiment and a mating side optical connector.

FIG. 1 is a perspective view of an optical connector according to the present embodiment and a mating side optical connector.

As shown in FIG. 1, an optical connector 10 according to the present embodiment is a receptacle optical connector to which a mating side optical connector 1 as a plug connector is fitted. The optical connector 10 is mounted on a circuit board 11, and the mating side optical connector 1 is fitted into a fitting recessed portion 12 in the optical connector 10.

Figure 2:
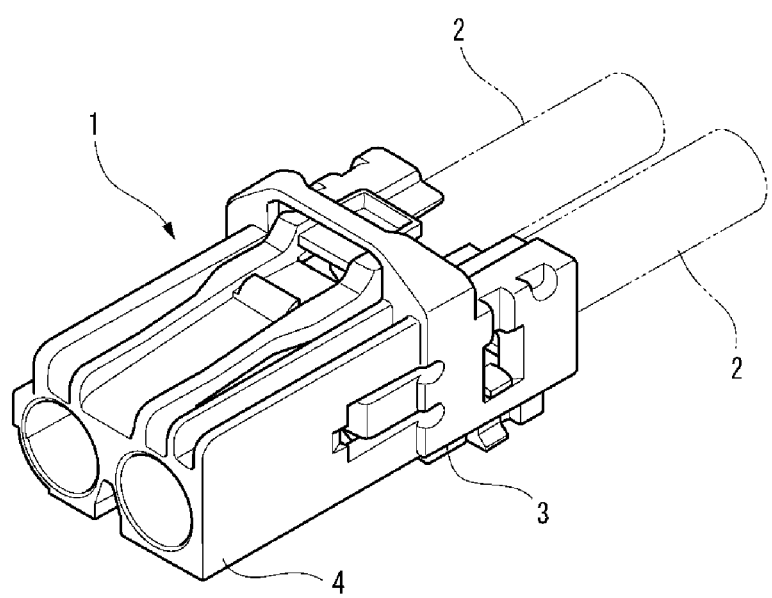
FIG. 2 is a perspective view of the mating side optical connector.

FIG. 2 is a perspective view of the mating side optical connector.

As shown in FIG. 2, the mating side optical connector 1 includes a housing 3 connected to an end portion of an optical fiber 2. A front end of the housing 3 is a fitting portion 4, and the fitting portion 4 is fitted into the fitting recessed portion 12 of the optical connector 10. Accordingly, the optical connector 10 and the optical fiber 2 of the mating side optical connector 1 can be brought into optical communication.

Figure 3:
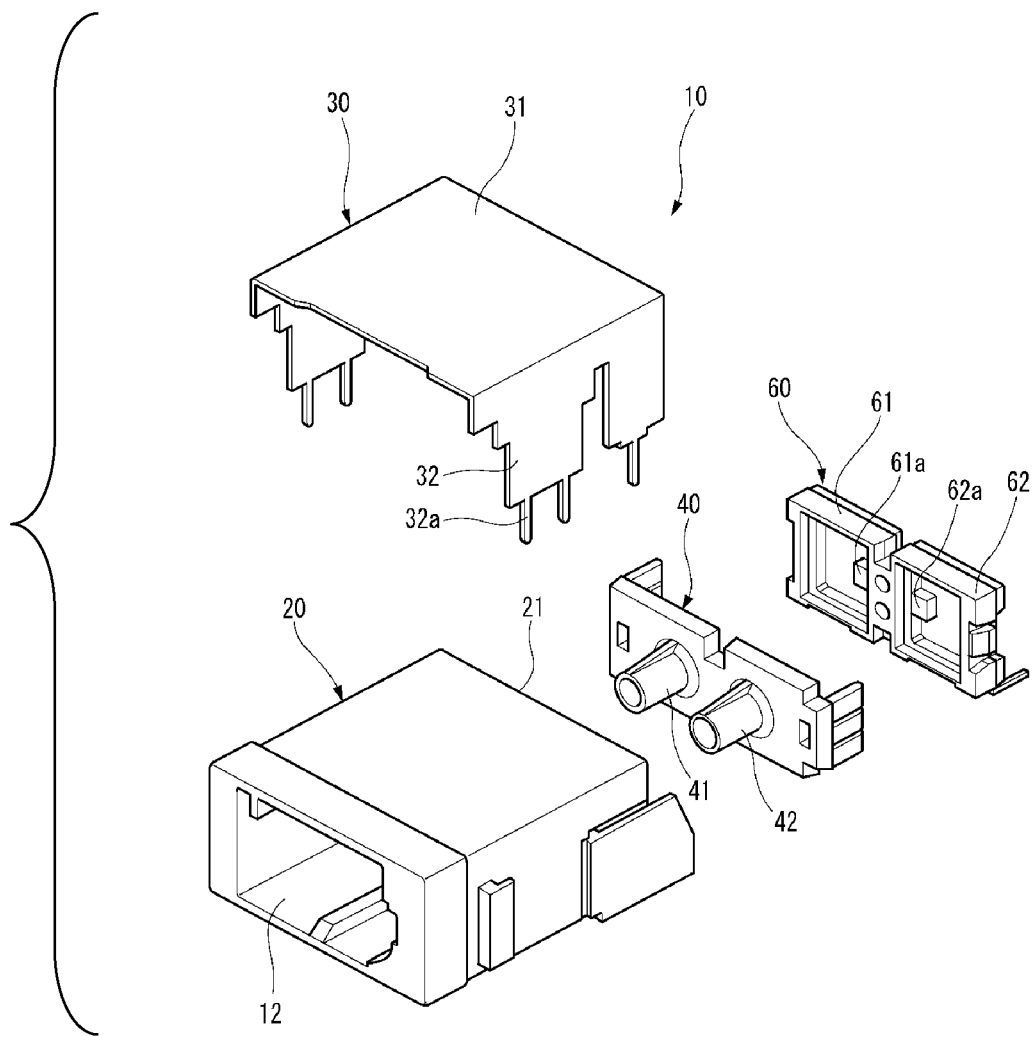
FIG. 3 is an exploded perspective view of the optical connector according to the present embodiment.

FIG. 3 is an exploded perspective view of the optical connector according to the present embodiment.

As shown in FIG. 3, the optical connector 10 includes a housing 20, a shield case 30, a lens body 40, and a fiber optic transceiver (FOT) 60 that is an optical conversion module.

The housing 20 is a member having a box shape and molded from synthetic resin. The housing 20 is formed with the fitting recessed portion 12 into which the fitting portion 4 of the mating optical connector 1 is fitted on a front end side. The housing 20 is provided with a ferrule (not shown) therein, and the end portion of the optical fiber 2 of the mating side optical connector 1 fitted in the fitting recessed portion 12 is fitted into the ferrule. The housing 20 includes an optical module accommodation portion (accommodation portion) 21 on a rear end side, and the lens body 40 and the FOT 60 are assembled in the optical module accommodation portion 21. In addition, the shield case 30 is fitted with and mounted on the housing 20 from the top. A plurality of protruding portions (not shown) are formed on a lower portion of the housing 20. The protruding portions are fitted into holes formed in the circuit board 11, so that the optical connector 10 is positioned when being mounted on the circuit board 11.

Figure 4A:
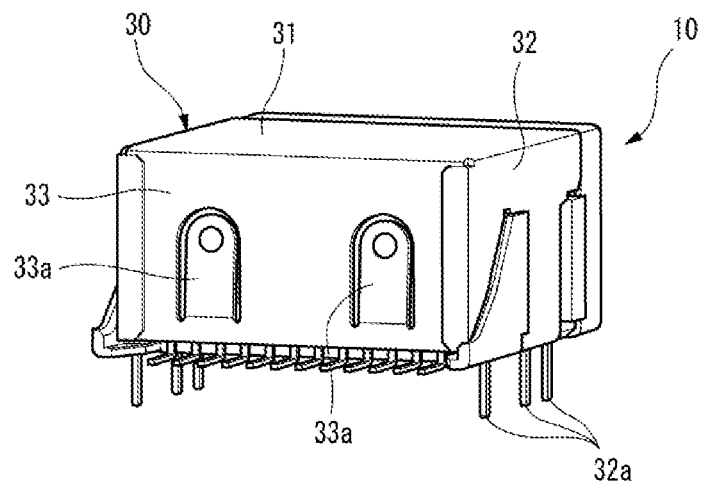
FIGS. 4A and 4B are views for explaining the optical connector.
Figure 4B:
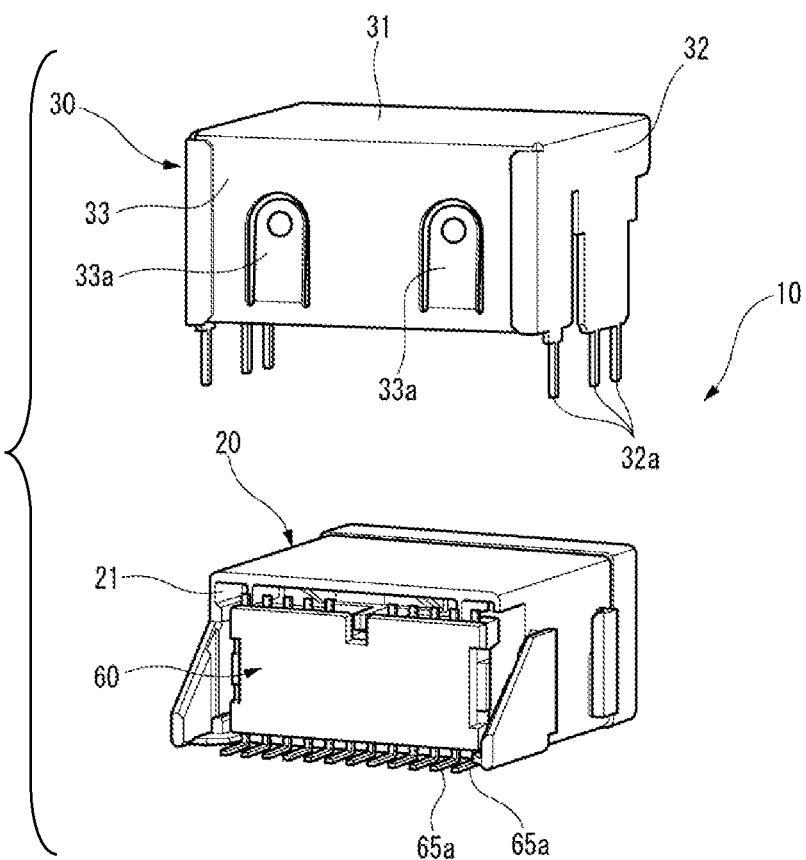

FIGS. 4A and 4B are views for explaining the optical connector. FIG. 4A is a perspective view of the optical connector as seen from a rear side. FIG. 4B is a perspective view of the housing and the shield case as seen from the rear side.

As shown in FIGS. 4A and 4B, the shield case 30 is formed into a box shape and includes a top plate portion 31, side plate portions 32 formed on both sides of the top plate portion 31, and a rear plate portion 33 formed on a rear side of the top plate portion 31. The shield case 30 is formed into a box shape by pressing a conductive metal plate or the like. The shield case 30 is attached to the housing 20 so as to cover and shield an upper portion, both side portions, and a rear portion of the housing 20. A plurality of leg portions 32a are formed on the side plate portions 32, and the leg portions 32a are inserted and soldered into through holes (not shown) of the circuit board 11. Accordingly, the optical connector 10 is fixed to the circuit board 11. Further, the rear plate portion 33 includes plate spring portions 33a protruding inward. The plate spring portions 33a press a rear surface of the FOT 60 housed in the optical module accommodation portion 21 of the housing 20. Accordingly, the lens body 40 and the FOT 60 housed in the optical module accommodation portion 21 of the housing 20 are maintained in a state of being held in the housing 20 by an urging force of the plate spring portions 33a.

Figure 5A:
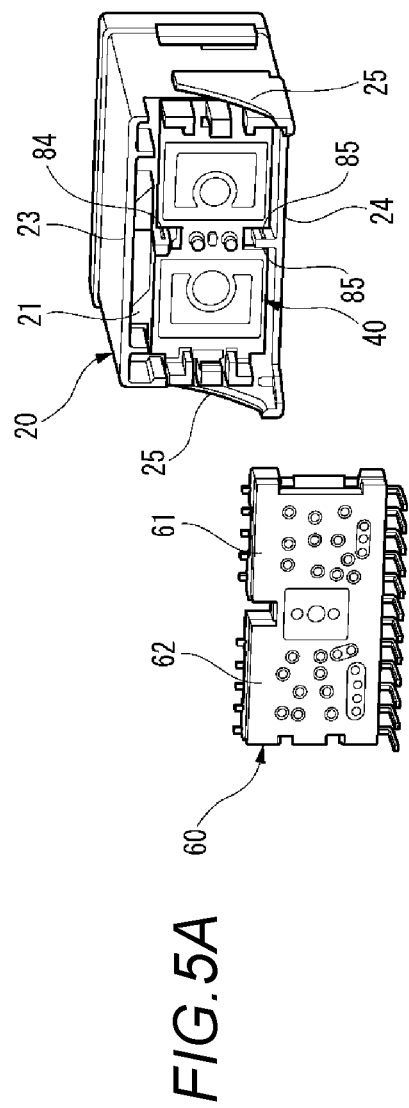
FIGS. 5A and 5B are views for explaining an optical module accommodation portion of the housing.
Figure 5B:
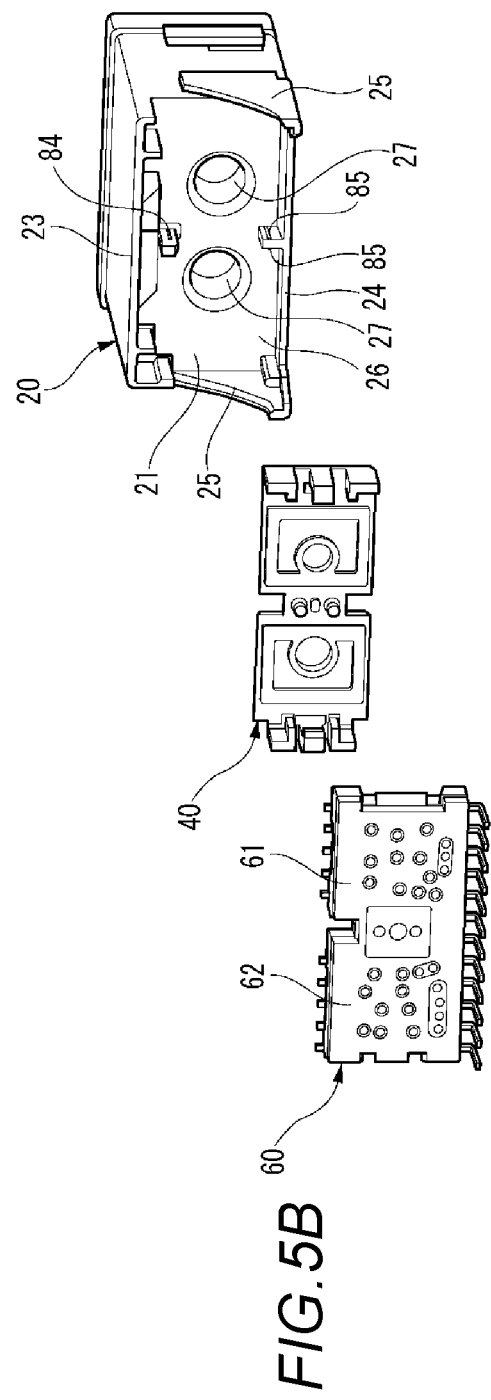

FIGS. 5A and 5B are views for explaining the optical module accommodation portion of the housing. FIG. 5A is a perspective view of the optical conversion module and the housing to which the lens body is attached as seen from the rear side. FIG. 5B is a perspective view of the housing, the lens body and the optical conversion module as seen from the rear side.

As shown in FIGS. 5A and 5B, the lens body 40 and the FOT 60 are assembled in the optical module accommodation portion 21 on the rear end side of the housing 20. The optical module accommodation portion 21 is formed in a recessed shape into which the lens body 40 and the FOT 60 are fitted. The optical module accommodation portion 21 includes an upper wall portion 23, a bottom wall portion 24, and a pair of side wall portions 25. In addition, a bottom portion of the recessed part of the optical module accommodation portion 21 is a contact surface 26, and two lens insertion holes 27 are formed in the contact surface 26.

Figure 6:
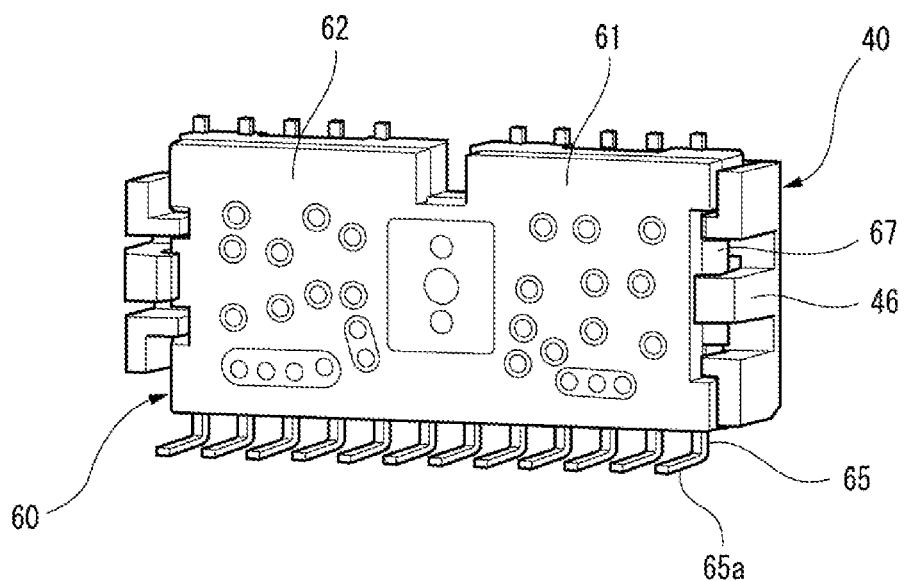
FIG. 6 is a perspective view of the lens body and the optical conversion module in an assembled state as seen from the rear side.

FIG. 6 is a perspective view of the lens body and the optical conversion module in an assembled state as seen from the rear side.

As shown in FIG. 6, the lens body 40 and the FOT 60 are combined with each other so as to be positioned. The lens body 40 and the FOT 60 are assembled to the optical module accommodation portion 21 of the housing 20 in a state of being combined with each other. Thereby, the FOT 60 is positioned with respect to the housing 20.

Figure 7A:
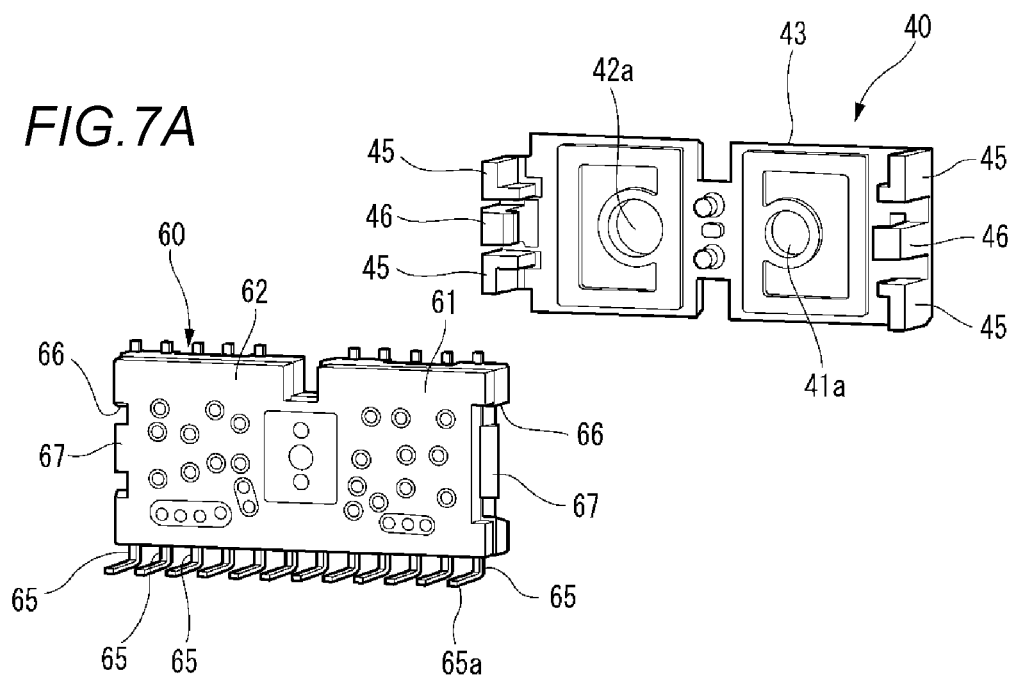
FIGS. 7A and 7B are views for explaining the lens body and the optical conversion module.
Figure 7B:
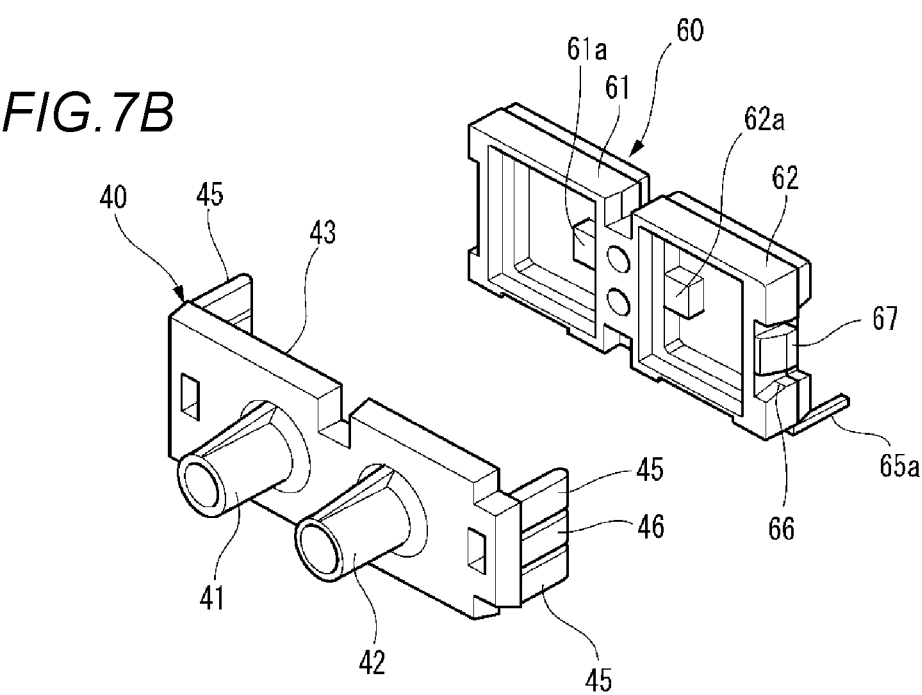

FIGS. 7A and 7B are views for explaining the lens body and the optical conversion module. FIG. 7A is a perspective view as seen from the rear side. FIG. 7B is a perspective view as seen from a front side.

As shown in FIGS. 7A and 7B, the lens body 40 includes a substrate portion 43 formed in a rectangular shape in the plan view, and a light emitting side lens portion 41 and a light receiving side lens portion 42 are formed on the substrate portion 43. The light emitting side lens portion 41 and the light receiving side lens portion 42 are provided side by side. The lens body 40 is integrally formed of transparent resin having light guiding properties, so that the light emitting side lens portion 41 and the light receiving side lens portion 42 are integrally provided to protrude forward from a front surface of the substrate portion 43. An FOT 60 side of the light emitting side lens portion 41 is an incident surface 41a, and an FOT 60 side of the light receiving side lens portion 42 is an emitting surface 42a. The lens body 40 is formed with engagement protrusions 45 and locking claws 46 on both sides of the substrate portion 43. The engagement protrusions 45 are provided on both sides of the locking claw 46.

The FOT 60 is formed in a rectangular shape in the plan view, and a light emitting side FOT 61 and a light receiving side FOT 62 are provided side by side on a front surface of the FOT 60. The light emitting side FOT 61 includes a light emitting element 61a such as a light emitting diode (LED), a vertical cavity surface emitting laser (VCSEL), for example, and the light receiving side FOT 62 includes a light receiving element 62a such as a photo diode (PD), for example. The FOT 60 is integrally formed of synthetic resin, so that the light emitting side FOT 61 and the light receiving side FOT 62 are integrally provided. A plurality of lead frames 65 are provided at a lower portion of the FOT 60. The lead frame 65 includes a connection portion 65a whose end portion is bent toward the rear side of the FOT 60. The connection portion 65a is disposed and soldered on a pad of the circuit board 11 so as to be electrically connected to a predetermined circuit of the circuit board 11. Recessed portions 66 are formed on both sides of the FOT 60, and a locking piece 67 is provided in the recessed portion 66 and protruding therefrom.

The FOT 60 is assembled to the rear surface side having the incident surface 41a and the emitting surface 42a of the lens body 40. At this time, the engagement protrusions 45 of the lens body 40 are engaged with the recessed portion 66 of the FOT 60, and the locking claw 46 of the lens body 40 is locked with the locking piece 67 of the FOT 60. Accordingly, the FOT 60 is assembled to the lens body 40, and the light emitting element 61a of the light emitting side FOT 61 and the light receiving element 62a of the light receiving side FOT 62 in the FOT 60 are disposed at positions facing the incident surface 41a of the light emitting side lens portion 41 and the emitting surface 42a of the light receiving side lens portion 42 in the lens body 40, respectively.

The assembly of the lens body 40 and the FOT 60 is fitted in the optical module accommodation portion 21 of the housing 20 and housed in a state of being positioned at a predetermined position. As a result, the light emitting side lens portion 41 and the light receiving side lens portion 42 of the lens body 40 are inserted into the lens insertion holes 27 of the housing 20, and a front surface of the lens body 40 is brought into contact with the contact surface 26. Accordingly, the light emitting side lens portion 41 and the light receiving side lens portion 42 of the lens body 40 are housed in the lens insertion holes 27 in a state of being positioned on the ferrule inside the housing 20.

Further, when the shield case 30 is attached to the housing 20, the FOT 60 is pressed by the plate spring portions 33a formed on the rear plate portion 33 of the shield case 30. Therefore, the lens body 40 and the FOT 60 are maintained in a state of being held in the optical module accommodation portion 21 of the housing 20.

In the optical connector 10, an optical signal converted and generated from an electrical signal by the light emitting side FOT 61 of the FOT 60 is incident on the light emitting side lens portion 41 of the lens body 40 from the incident surface 41a and is guided to one optical fiber 2 of the mating side optical connector 1 fitted to the fitting recessed portion 12. In addition, an optical signal incident on the light receiving side lens portion 42 from the other optical fiber 2 of the mating side optical connector 1 is emitted from the emitting surface 42a of the light receiving side lens portion 42 of the lens body 40, received by the light receiving side FOT 62 of the FOT 60, and converted into an electrical signal.

In the optical connector 10, when the FOT 60 is loosened relative to the housing 20, positional displacement occurs between the lens body 40 and the FOT 60 due to the looseness, and optical loss occurs between the lens body 40 and the FOT 60. Further, if the support of the FOT 60 with respect to the housing 20 is weak, the FOT 60 may be displaced or inclined with respect to the housing 20 due to a force applied at the time of adjusting and aligning positions of a plurality of lead frames 65 extending from the FOT 60. Further, when the FOT 60 is inclined with respect to the housing 20, the connection portion 65a of the lead frame 65 may be lifted with respect to the pad of the circuit board 11 and connection failure may occur.

For this reason, the optical connector 10 according to the present embodiment includes a longitudinal support mechanism and a lateral support mechanism that support the FOT 60 to the housing 20 with high accuracy without looseness.

Next, the longitudinal support mechanism and the lateral support mechanism provided in the optical connector 10 will be described.

Figure 8:
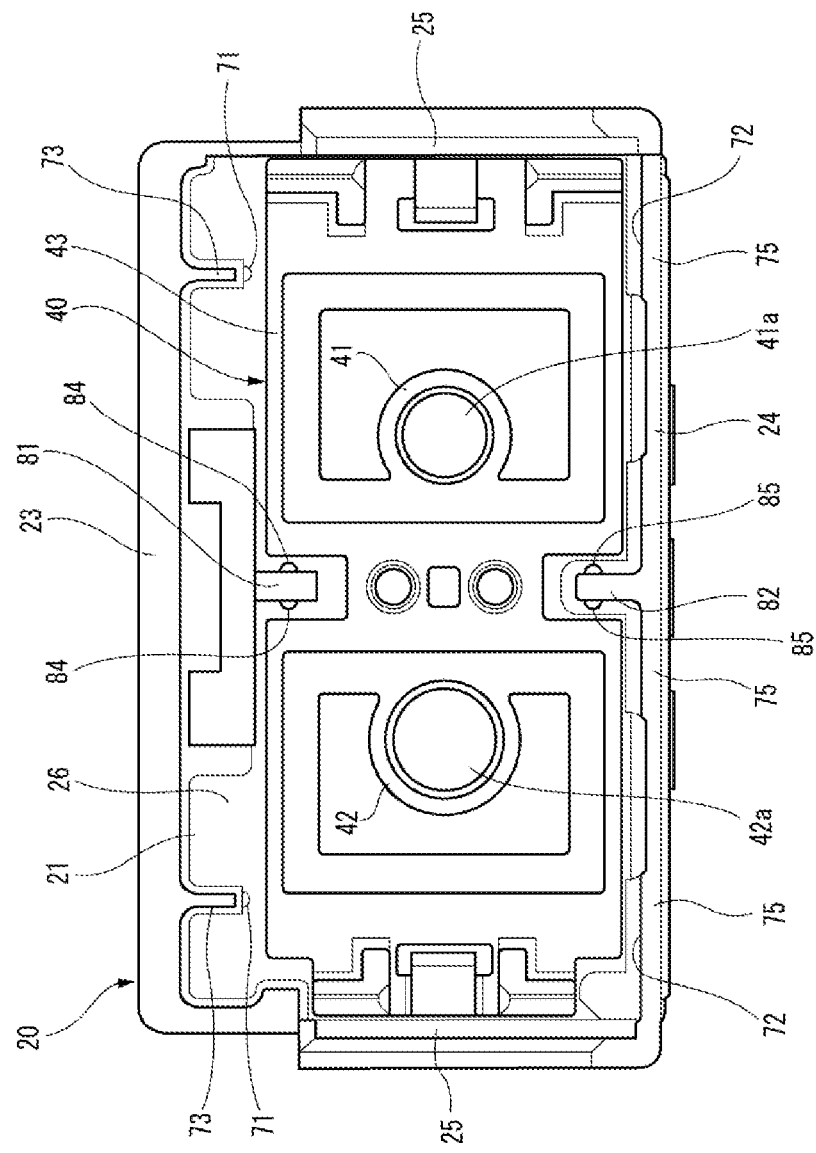
FIG. 8 is a front view of the optical module accommodation portion of the housing for explaining a longitudinal support mechanism and a lateral support mechanism that support the optical conversion module.
Figure 9A:
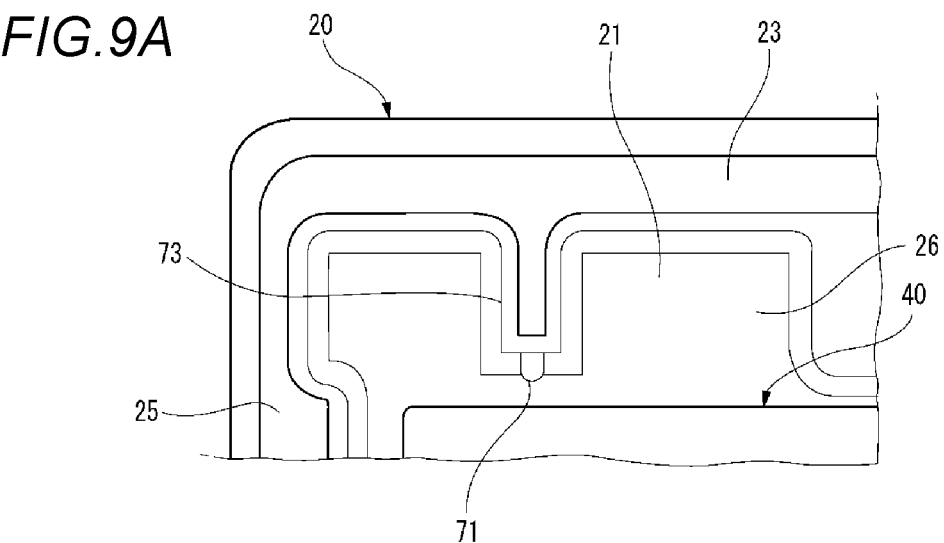
FIG. 9A is an enlarged view of apart of the optical module accommodation portion in which a rib is formed.
Figure 9B:
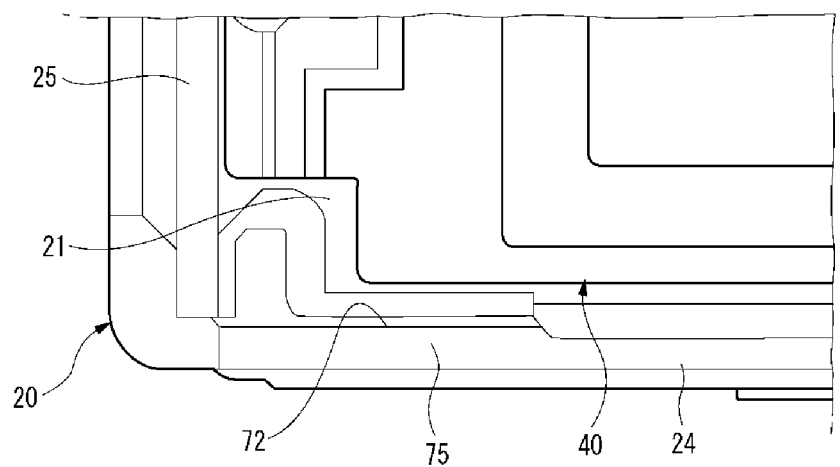
FIG. 9B is an enlarged view of a part of the optical module accommodation portion in which a reference surface is formed.
Figure 10A:
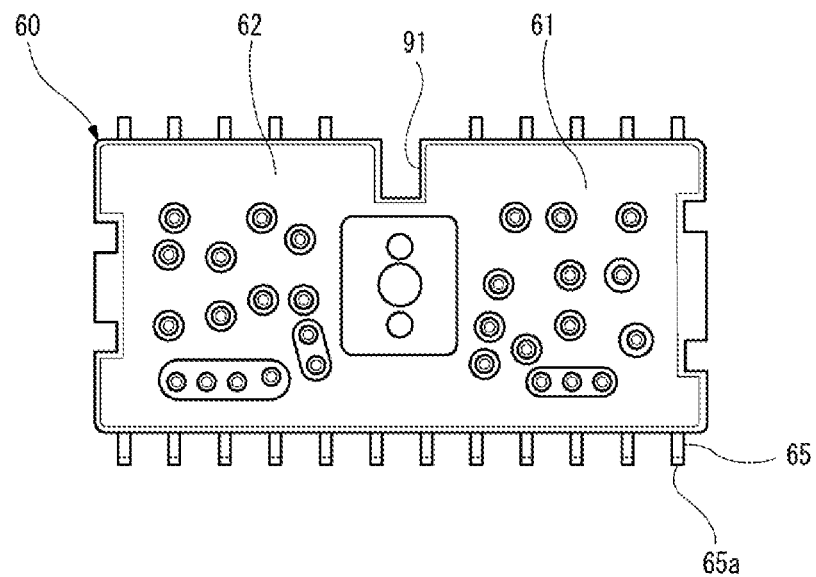
FIG. 10A is a back view of the optical conversion module.
Figure 10B:
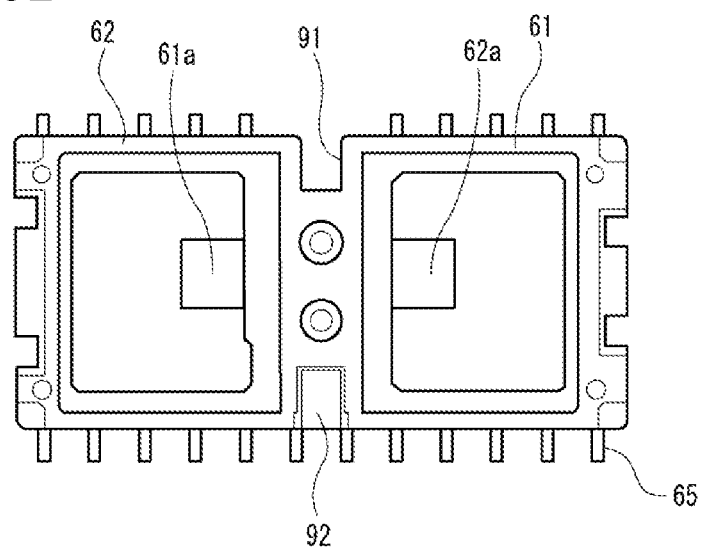
FIG. 10B is a front view of the optical conversion module.
Figure 11A:
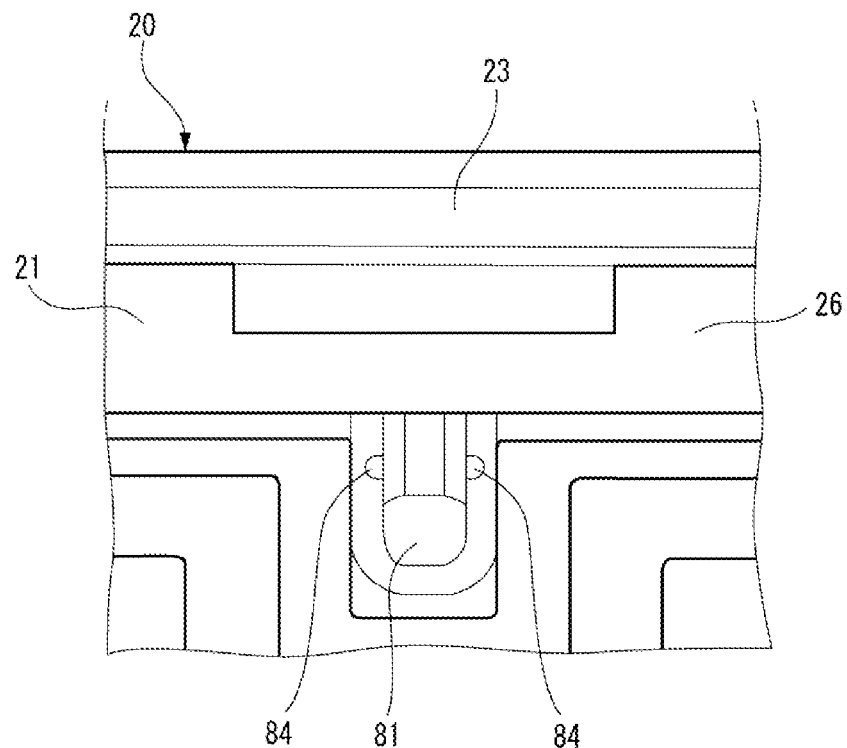
FIG. 11A is an enlarged view of a part of the optical module accommodation portion in which a support protrusion on an upper side is formed.
Figure 11B:
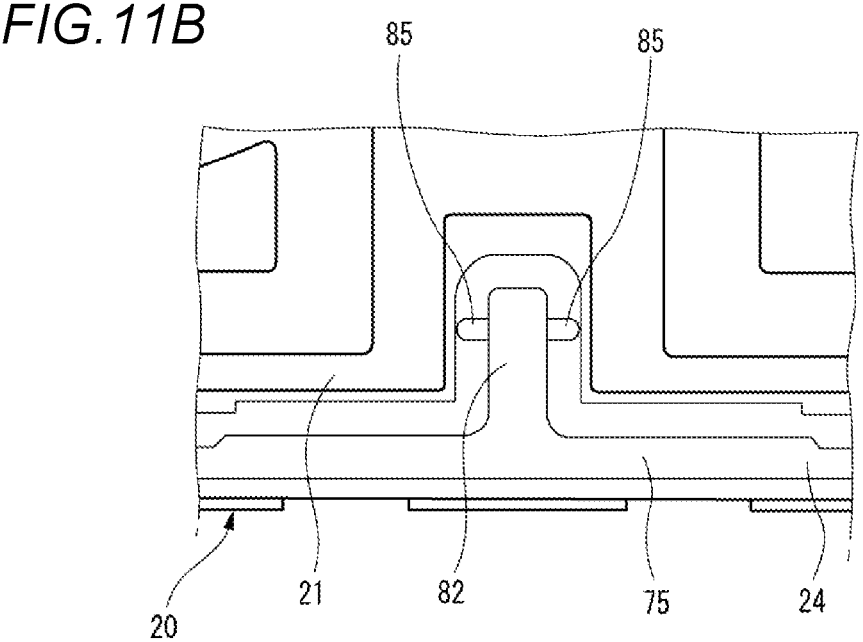
FIG. 11B is an enlarged view of a part of the optical module accommodation portion in which a support protrusion on a lower side is formed.

FIG. 8 is a front view of the optical module accommodation portion of the housing for explaining the longitudinal support mechanism and the lateral support mechanism that support the FOT. FIG. 9A is an enlarged view of a part of the optical module accommodation portion in which a rib is formed. FIG. 9B is an enlarged view of a part of the optical module accommodation portion in which a reference surface is formed. FIG. 10A is a back view of the FOT. FIG. 10B is a front view of the FOT. FIG. 11A is an enlarged view of a part of the optical module accommodation portion in which a support protrusion on an upper side is formed. FIG. 11B is an enlarged view of a part of the optical module accommodation portion in which a support protrusion on a lower side is formed.

(Longitudinal Support Mechanism)

As shown in FIG. 8, the optical connector 10 includes pressing ribs 71 and reference surfaces 72 provided in the housing 20. A longitudinal support mechanism is configured by the pressing rib 71 and the reference surface 72.

The pressing ribs 71 are provided at an upper portion of the optical module accommodation portion 21 of the housing 20. The pressing ribs 71 are provided in the vicinity of both sides along a width direction of the housing 20. As shown in FIG. 9A, the optical module accommodation portion 21 includes a protruding portion 73 formed integrally with the upper wall portion 23 and the contact surface 26, and the pressing rib 71 is formed at a lower end of the protruding portion 73. The protruding portion 73 and the pressing rib 71 are formed along a depth direction of the optical module accommodation portion 21.

As shown in FIG. 8, the housing 20 includes a plurality of thick portions 75 on the bottom wall portion 24 configuring the optical module accommodation portion 21. The thick portions 75 are formed in the center portion and both side portions in the width direction of the bottom wall portion 24 of the housing 20. Further, as shown in FIG. 9B, upper surfaces of the thick portions 75 on both side portions serve as the reference surfaces 72.

The height dimension of the FOT 60 is slightly smaller than a distance between the protruding portion 73 and the reference surface 72 and slightly larger than a distance between a front end portion of the pressing rib 71 and the reference surface 72.

(Lateral Support Mechanism)

As shown in FIGS. 8, 10A and 10B, the optical connector 10 includes support protrusions 81, 82 provided on the housing 20 and support recessed portions 91, 92 provided in the FOT 60. A lateral support mechanism is configured by the support protrusions 81, 82 and the support recessed portions 91, 92.

The support protrusions 81, 82 are provided on the center portions in the width direction of the optical module accommodation portion 21. One support protrusion 81 is provided on the upper portion of the optical module accommodation portion 21. The other support protrusion 82 is provided on a lower portion of the optical module accommodation portion 21.

As shown in FIG. 11A, one support protrusion 81 is formed integrally with the contact surface 26 of the optical module accommodation portion 21, and protrudes from the contact surface 26. The support protrusion 81 is formed with support ribs 84 on both sides thereof. The support ribs 84 are formed along the depth direction of the optical module accommodation portion 21. As shown in FIG. 11B, the other support protrusion 82 is formed integrally with the contact surface 26 and the thick portion 75 at the center portion in the width direction of the bottom wall portion 24 of the optical module accommodation portion 21, and protrudes from the bottom wall portion 24 and the contact surface 26. The support protrusion 82 is formed with support ribs 85 on both sides thereof. The support ribs 85 are formed along the depth direction of the optical module accommodation portion 21.

As shown in FIGS. 10A and 10B, the support recessed portions 91, 92 are provided at center portions of the FOT 60 in the width direction. One support recessed portion 91 is provided at an upper portion of the FOT 60. The support recessed portion 91 is formed in a cutout shape penetrating the front and back of the FOT 60. The other support recessed portion 92 is provided at the lower portion of the FOT 60. The support recessed portion 92 is formed in a recessed shape where a front side surface, which is the surface of the FOT 60 to be assembled to the housing 20, is recessed.

The width dimension of the support recessed portion 91 is slightly larger than the width dimension of the support protrusion 81 and slightly smaller than a distance between front end portions of the support ribs 84. Similarly, the width dimension of the support recessed portion 92 is slightly larger than the width dimension of the support protrusion 82 and slightly smaller than a distance between front end portions of the support ribs 85.

Next, a case of assembling the FOT 60 to the optical module accommodation portion 21 of the housing 20 will be described.

Figure 12:
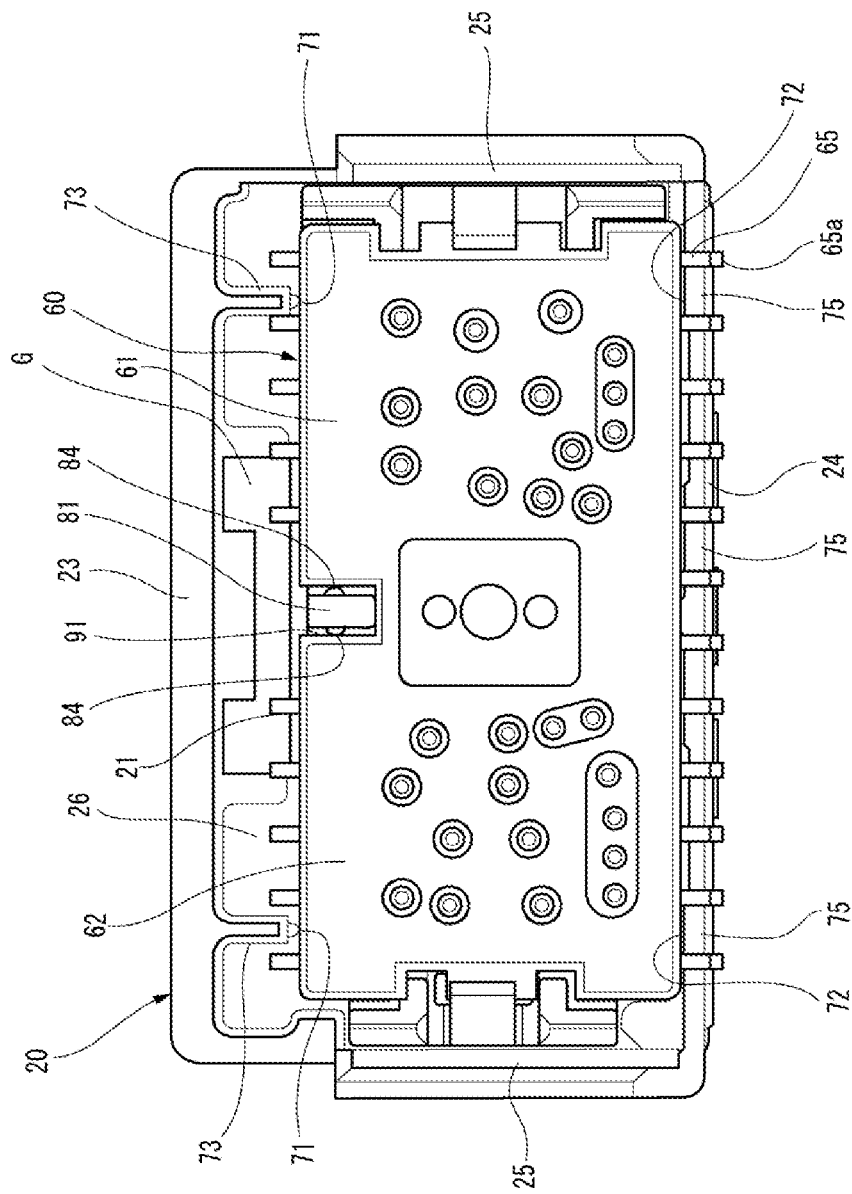
FIG. 12 is a front view of the optical module accommodation portion of the housing to which the optical conversion module is assembled.
Figure 13A:
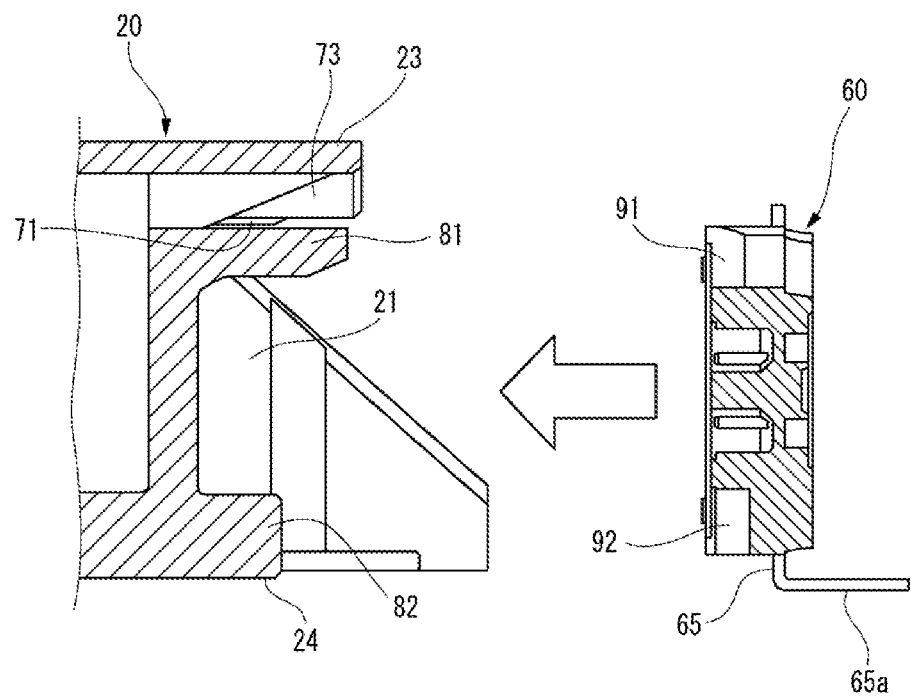
FIGS. 13A and 13B are views for explaining the assembling of the optical conversion module to the optical module accommodation portion of the housing.
Figure 13B:
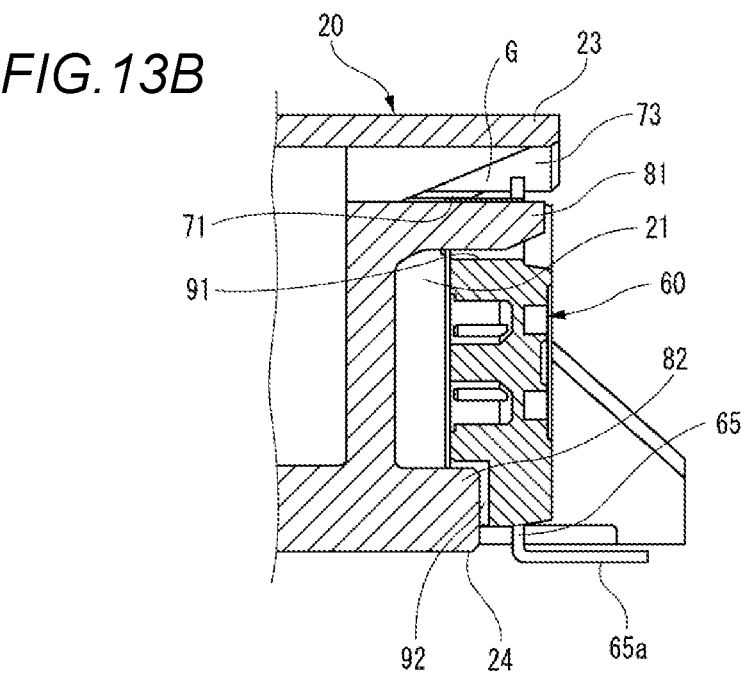
Figure 14A:
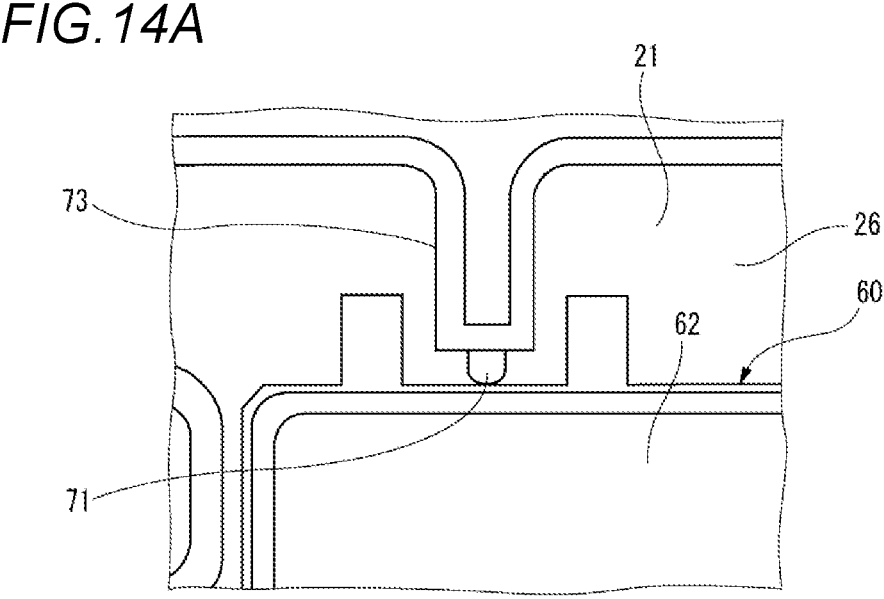
FIG. 14A is an enlarged view of the rib and an upper portion of the optical conversion module.
Figure 14B:
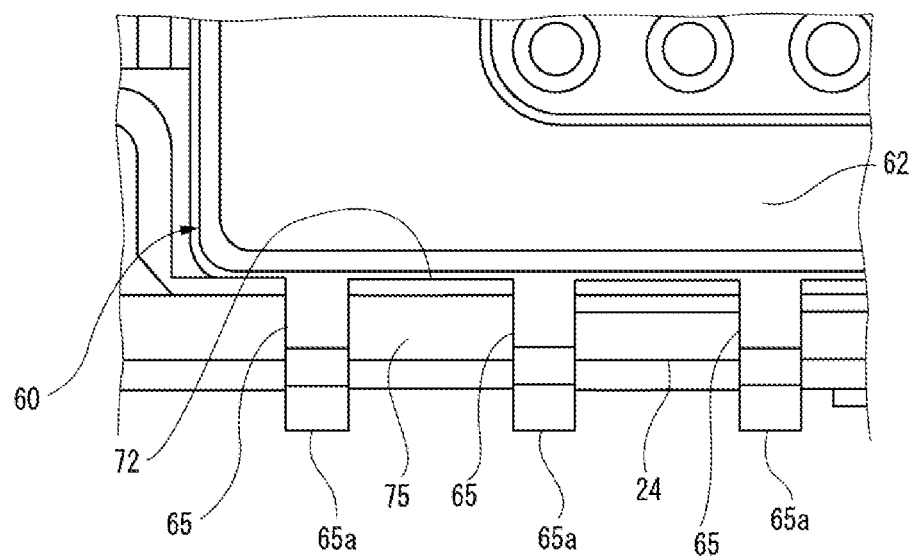
FIG. 14B is an enlarged view of the reference surface and a lower portion of the optical conversion module.
Figure 15A:
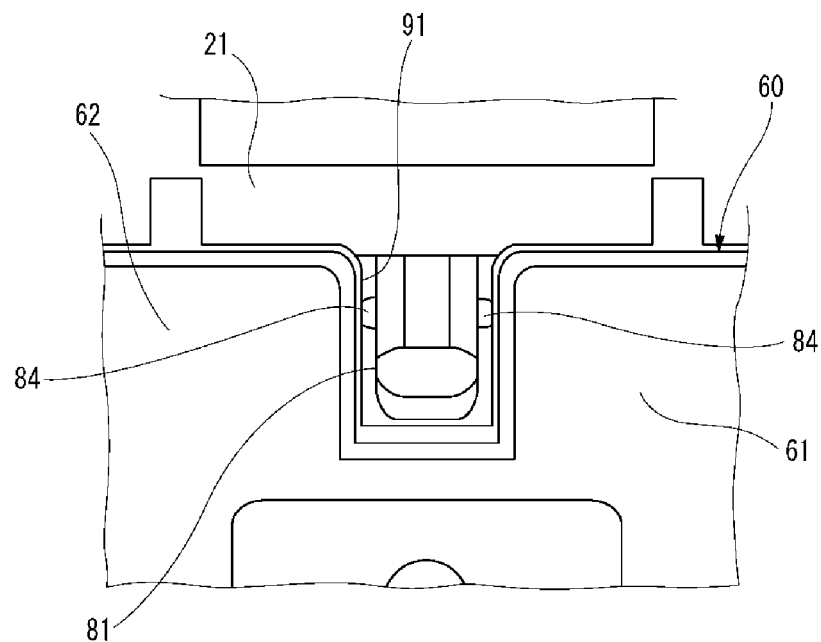
FIG. 15A is an enlarged view of a fitting portion of a support recessed portion at the upper portion of the optical conversion module and the support protrusion.

FIG. 12 is a front view of the optical module accommodation portion of the housing to which the FOT is assembled. FIGS. 13A and 13B are views for explaining the assembling of the FOT to the optical module accommodation portion of the housing. FIG. 13A is a sectional view of the FOT and a part of the housing before the assembling. FIG. 13B is a sectional view of the FOT and the part of the housing after the assembling. FIG. 14A is an enlarged view of the rib and an upper portion of the FOT, and FIG. 14B is an enlarged view of the reference surface and a lower portion of the FOT. FIG. 15A is an enlarged view of a fitting portion of the support recessed portion at the upper portion of the FOT and the support protrusion, and FIG. 15B is an enlarged view of a fitting portion of the support recessed portion at the lower portion of the FOT and the support protrusion.

As shown in FIGS. 12, 13A and 13B, when the FOT 60 combined with the lens body 40 is assembled to the optical module accommodation portion 21 of the housing 20, the FOT 60 is fitted into the optical module accommodation portion 21 formed into a recessed shape.

At this time, as shown in FIG. 14A, two pressing ribs 71 of the housing 20 are compressively deformed by coming into contact with the upper portion in the vicinity of both sides of the FOT 60 respectively in the longitudinal support mechanism. Accordingly, the upper portion of the FOT 60 is pressed downward by a reactive force received from the pressing ribs 71, and as shown in FIG. 14B, the lower portion in the vicinity of both sides of the FOT 60 is pressed against the reference surface 72. As a result, the FOT 60 is supported without looseness with the reference surface 72 as a reference, and is housed in the optical module accommodation portion 21 of the housing 20 in a state of being positioned with high accuracy.

Figure 15B:
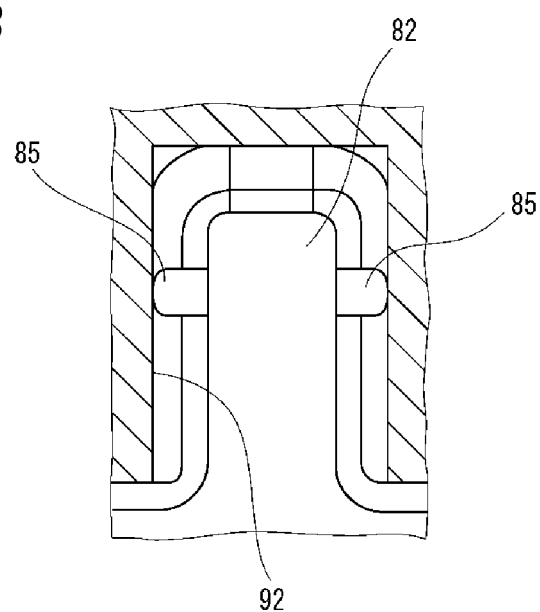
FIG. 15B is an enlarged view of a fitting portion of a support recessed portion at the lower portion of the optical conversion module and the support protrusion.

Further, in the lateral support mechanism, as shown in FIG. 15A, the support protrusion 81 of the housing 20 is fitted into the support recessed portion 91 of the FOT 60, and as shown in FIG. 15B, the support protrusion 82 of the housing 20 is fitted into the support recessed portion 92 of the FOT 60. At this time, the support ribs 84, 85 of the support protrusions 81, 82 are compressively deformed by coming into contact with inner side surfaces of the support recessed portions 91, 92. Thereby, the FOT 60 is positioned with high accuracy in the width direction with respect to the housing 20 while looseness in the width direction is suppressed.

As described above, according to the optical connector 10 of the present embodiment, when the FOT 60 combined with the lens body 40 is fitted into the optical module accommodation portion 21 of the housing 20, the FOT 60 is pressed against the reference surface 72 by the pressing ribs 71 of the longitudinal support mechanism. Accordingly, the FOT 60 can be assembled to the housing 20 in a state of being positioned with high accuracy in a longitudinal direction without looseness. Therefore, positional displacement between the lens body 40 and the FOT 60 due to the looseness of the FOT 60 with respect to the housing 20 can be eliminated, optical loss between the light emitting side lens portion 41, light receiving side lens portion 42 of the lens body 40 and the light emitting side FOT 61, light receiving side FOT 62 of the FOT 60 is suppressed, so that a high performance optical connector 10 excellent in optical transmission can be provided.

Figure 16A:
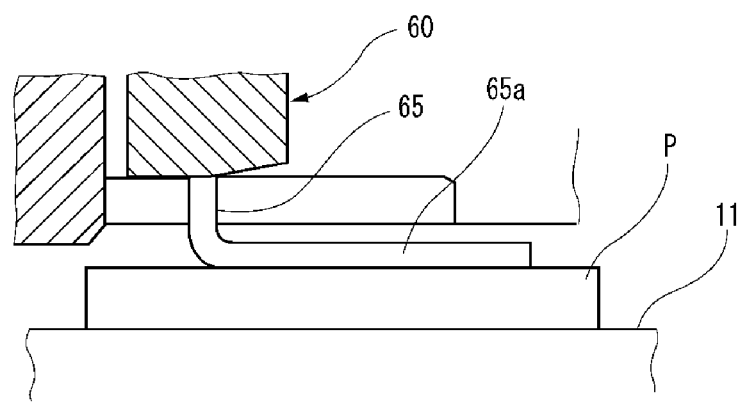
FIG. 16A is a side view of a lead frame disposed on a pad of a circuit board.

Further, the lower portion of the FOT 60 is in contact with the reference surface 72 of the optical module accommodation portion 21 of the housing 20 so as to be positioned with high accuracy without inclination, so that the lead frames 65 extending from the FOT 60 can be aligned in the width direction. Accordingly, as shown in FIG. 16A, when the optical connector 10 is mounted on the circuit board 11, the connection portion 65a of the lead frame 65 can be accurately disposed and fitted to the pad P of the circuit board 11. Further, the FOT 60 is strongly supported in the optical module accommodation portion 21 of the housing 20 by the longitudinal support mechanism, so that the FOT 60 can be suppressed from being displaced or inclined with respect to the housing 20 due to a force applied at the time of adjusting and aligning positions of the lead frames 65 extending from the FOT 60. Accordingly, it is possible to eliminate defective fitting due to the occurrence of a gap between the pad P of the circuit board 11 and the connection portion 65a of the lead frame 65.

Further, the reference surfaces 72 and the pressing ribs 71 are provided at a plurality of positions spaced apart in the width direction of the optical module accommodation portion 21, so that the FOT 60 can be positioned in a well-balanced manner in the width direction with respect to the housing 20, and the positioning accuracy of the FOT 60 can be further improved.

In addition, the pressing rib 71 is formed at the lower end of the protruding portion 73, so that the supporting strength of the pressing rib 71 can be increased, and the FOT 60 can be more reliably pressed against the reference surface 72. Further, a gap G is formed, due to the protruding portion 73, between the FOT 60 fitted into the optical module accommodation portion 21 and the upper wall portion 23 of the optical module accommodation portion 21 (see FIGS. 12 and 15B). Accordingly, the heat generated by the light emitting side FOT 61 and the light receiving side FOT 62 of the FOT 60 can be smoothly discharged from the gap G to the outside, and the influence of heat can be suppressed by improving the heat radiation effect of the light emitting side FOT 61 and the light receiving side FOT 62.

Figure 16B:
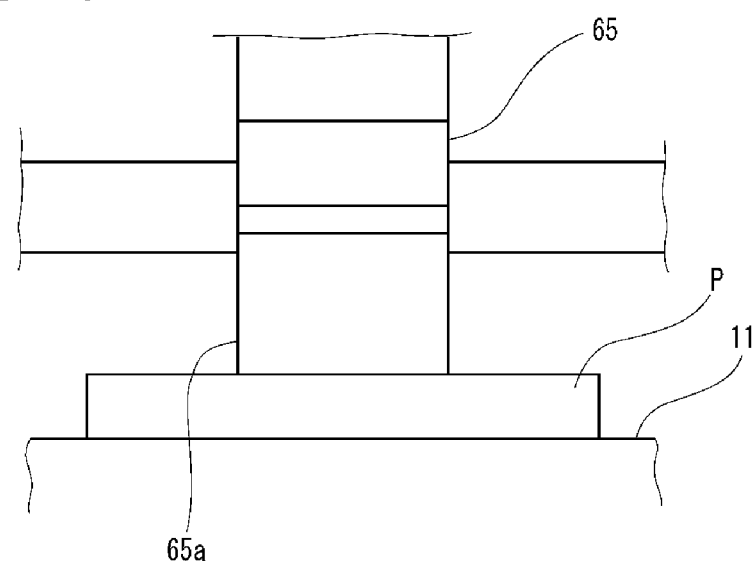
FIG. 16B is a front view of the lead frame disposed on the pad of the circuit board.

Further, according to the optical connector 10 of the present embodiment, when the FOT 60 combined with the lens body 40 is fitted into the optical module accommodation portion 21 of the housing 20, the support protrusions 81, 82 are fitted into the support recessed portions 91, 92, and the inner side surfaces of the support recessed portions 91, 92 are pressed by the support ribs 84, 85 formed on the support protrusions 81, 82. Accordingly, the FOT 60 can be assembled in a state of being positioned with high accuracy without looseness in the lateral direction with respect to the housing 20, optical loss between the light emitting side lens portion 41, light receiving side lens portion 42 of the lens body 40 and the light emitting side FOT 61, light receiving side FOT 62 of the FOT 60 is suppressed, so that a high performance optical connector 10 excellent in optical transmission can be provided. In addition, since the FOT 60 is positioned with high accuracy in the lateral direction with respect to the housing 20, the lead frames 65 extending from the FOT 60 are also positioned with high accuracy. Accordingly, as shown in FIG. 16B, when the optical connector 10 is mounted on the circuit board 11, the connection portion 65a of the lead frame 65 can be accurately disposed and fitted to the pad P of the circuit board 11.

Further, the FOT 60 is positioned in the height direction at a plurality of positions spaced apart by support protrusions 81, 82 and support recessed portions 91, 92, so that the FOT 60 can be positioned in a well-balanced manner in the height direction with respect to the housing 20, and the positioning accuracy of the FOT 60 can be further improved. Further, it is possible to suppress the relative rotational displacement between the housing 20 and the FOT 60.

In addition, the support protrusion 82 provided at the lower portion is integrally formed with the bottom wall portion 24 of the optical module accommodation portion 21, so that the support protrusion 82 is reinforced, and distortion such as warp of the bottom wall portion 24 having the reference surface 72 can be suppressed. Accordingly, the FOT 60 to be assembled to the housing 20 can be positioned with higher accuracy.

Incidentally, the present invention is not limited to the above-described embodiment, but may be appropriately modified, improved or the like. In addition, materials, shapes, dimensions, numerals, disposition locations or the like of each constituent element in the above-described embodiment are optional are not limited as long as the object of the invention can be achieved.

Here, characteristics of the embodiment of the optical connector according to the present invention described above are summarized briefly in the following [1] to [5], respectively.

[1] An optical connector (10) comprising:
a lens body (40) including a lens portion (light emitting side lens portion 41, light receiving side lens portion 42);
an optical conversion module (FOT 60); and
a housing (20) including an accommodation portion (optical module accommodation portion 21) having a recessed portion, the optical conversion module (FOT 60) combined with the lens body (40) being fitted and assembled into the accommodation portion (optical module accommodation portion 21),
wherein the optical conversion module (FOT 60) includes a light element (light emitting element 61a, light receiving element 62a) disposed at a position facing the lens portion (light emitting side lens portion 41, light receiving side lens portion 42) when combining the optical conversion module with the lens body (40),
wherein the housing (20) includes a longitudinal support mechanism,
wherein the longitudinal support mechanism includes a reference surface (72) and a pressing rib (71),
wherein the reference surface (72) is provided at a bottom wall portion (24) of the accommodation portion (optical module accommodation portion 21) and abuts on a lower portion of the optical conversion module (FOT 60), and
wherein the pressing rib (71) is provided at an upper wall portion (23) of the accommodation portion (optical module accommodation portion 21) and abuts on an upper portion of the optical conversion module (FOT 60) so as to press the optical conversion module (FOT 60) against the reference surface (72).

[2] The optical connector according to the above-described [1],
wherein the reference surfaces (72) and the pressing ribs (71) are provided at a plurality of positions spaced apart along a width direction of the accommodation portion (optical module accommodation portion 21), and
wherein the width direction is a direction perpendicular to an opposing direction of the bottom wall portion (24) and the upper wall portion (23).

[3] The optical connector according to the above-described [1] or [2],
wherein the pressing rib (71) is formed at a lower end of a protruding portion (73) protruding downward from the upper wall portion (23).

[4] The optical connector according to any one of the above-described [1] to [3], further comprising:
a lateral support mechanism;
wherein the lateral support mechanism includes a support protrusion (81, 82), a support recessed portion (91, 92), support ribs (84, 85),
wherein the support protrusion (81, 82) protrudes toward an assembled side of the accommodation portion (optical module accommodation portion 21) assembled with the optical conversion module (FOT 60),
wherein the support recessed portion (91, 92) is formed in the optical conversion module (FOT 60) and fitted with the support protrusion (81, 82), and
wherein the support ribs (84, 85) are formed on both side portions of the support protrusions (81, 82) and press an inner side surfaces of the support recessed portions (91, 92).

[5] The optical connector according to the above-described [4],
wherein the support protrusions (81, 82) are provided at a plurality of positions spaced apart along a height direction of the accommodation portion (optical module accommodation portion 21),
wherein the support recessed portions (91, 92) are provided at a plurality of position spaced apart along the height direction of the optical conversion module (FOT 60),
wherein one of the support protrusions (82) provided on the lower portion is integrally formed with the bottom wall portion (24), and
wherein the height direction is the opposing direction of the bottom wall portion (24) and the upper wall portion (23).

DESCRIPTION OF REFERENCE NUMERALS AND SIGNS 10 optical connector
20 housing
21 optical module accommodation portion (accommodation portion)
23 upper wall portion
24 bottom wall portion
40 lens body 41 light emitting side lens portion (lens portion)
42 light receiving side lens portion (lens portion)
60 optical conversion module (FOT)
61 light emitting side FOT
61a light emitting element (light element)
62 light receiving side FOT
62a light receiving element (light element)
71 pressing rib (longitudinal support mechanism)
72 reference surface (longitudinal support mechanism)
73 protruding portion
81, 82 support protrusion (lateral support mechanism)
84, 85 support rib (lateral support mechanism)
91, 92 support recessed portion (lateral support mechanism)

What is claimed is:

1. An optical connector comprising:
a lens body including a lens portion;
an optical conversion module; and
a housing including an accommodation portion having a recessed portion, the optical conversion module combined with the lens body being fitted and assembled into the accommodation portion,
wherein the optical conversion module includes a light element disposed at a position facing the lens portion when combining the optical conversion module with the lens body,
wherein the housing includes a longitudinal support mechanism,
wherein the longitudinal support mechanism includes a reference surface and a pressing rib,
wherein the reference surface is provided at a bottom wall portion of the accommodation portion and abuts on a lower portion of the optical conversion module, and
wherein the pressing rib is provided at an upper wall portion of the accommodation portion and abuts on an upper portion of the optical conversion module so as to press the optical conversion module against the reference surface.

2. The optical connector according to claim 1,
wherein the reference surfaces and the pressing ribs are provided at a plurality of positions spaced apart along a width direction of the accommodation portion, and
wherein the width direction is a direction perpendicular to an opposing direction of the bottom wall portion and the upper wall portion.

3. The optical connector according to claim 1,
wherein the pressing rib is formed at a lower end of a protruding portion protruding downward from the upper wall portion.

4. The optical connector according to claim 1, further comprising a lateral support mechanism,
wherein the lateral support mechanism includes a support protrusion, a support recessed portion, support ribs,
wherein the support protrusion protrudes toward an assembled side of the accommodation portion assembled with the optical conversion module,
wherein the support recessed portion is formed in the optical conversion module and fitted with the support protrusion, and
wherein the support ribs are formed on both side portions of the support protrusions and press an inner side surfaces of the support recessed portions.

5. The optical connector according to claim 4,
wherein the support protrusions are provided at a plurality of positions spaced apart along a height direction of the accommodation portion,
wherein the support recessed portions are provided at a plurality of positions spaced apart along the height direction of the optical conversion module,
wherein one of the support protrusions provided on the lower portion is integrally formed with the bottom wall portion, and
wherein the height direction is the opposing direction of the bottom wall portion and the upper wall portion.

* * * * *